United States Patent
Burns et al.

[11] Patent Number: 6,082,305
[45] Date of Patent: *Jul. 4, 2000

[54] PET CARRIER FOR TRAVELERS

[75] Inventors: Rebecca Sue Burns, Arlington; Wendell A. Poteet, Fort Worth, both of Tex.

[73] Assignee: Designer Products, Inc., Arlington, Tex.

[ * ] Notice: This patent is subject to a terminal disclaimer.

[21] Appl. No.: 09/323,711

[22] Filed: Jun. 1, 1999

Related U.S. Application Data

[63] Continuation of application No. 09/143,825, Aug. 31, 1998, which is a continuation-in-part of application No. 08/926,525, Sep. 8, 1997, abandoned.

[51] Int. Cl.⁷ .................................................. A01K 29/00
[52] U.S. Cl. ............................................................ 119/497
[58] Field of Search .................................... 119/497, 512, 119/474, 513, 482, 496, 498; 190/103, 107

[56] References Cited

U.S. PATENT DOCUMENTS

| | | | |
|---|---|---|---|
| D. 254,631 | 4/1980 | Albright | D30/1 |
| 3,547,079 | 12/1970 | Bassett | 119/497 |
| 3,850,144 | 11/1974 | Springer et al. | 119/497 |
| 4,334,601 | 6/1982 | Davis | 190/44 |
| 4,484,540 | 11/1984 | Yammamoto | 119/497 |
| 4,488,624 | 12/1984 | Myers | 190/120 |
| 4,773,515 | 9/1988 | Kotkins, Jr. | 190/103 |
| 4,805,748 | 2/1989 | Gerch | 190/103 |
| 4,830,154 | 5/1989 | Gerch et al. | 190/103 |
| 4,977,857 | 12/1990 | Slawinski | 119/497 |
| 5,105,919 | 4/1992 | Bomes et al. | 190/18 A |
| 5,170,745 | 12/1992 | Burdette, Jr. | 119/497 |
| 5,197,580 | 3/1993 | Berman et al. | 190/107 |
| 5,288,150 | 2/1994 | Bearman | 383/38 |
| 5,413,199 | 5/1995 | Clement | 190/108 |
| 5,671,698 | 9/1997 | Farrugia | 119/497 |

*Primary Examiner*—Thomas Price
*Attorney, Agent, or Firm*—Michael A. O'Neil

[57] ABSTRACT

A pet carrier for use in transporting pets within the passenger compartments of aircraft includes selectively closeable windows formed from mesh fabric, a fully openable end and a fully openable side for providing access to the interior of the pet carrier, an access port in the top having a full length double zipper closure and a rotatable locking member for securing the access port in the closed condition, a multi-function strap securable to the opposite ends of the pet carrier for use as a shoulder strap and securable to one end of the pet carrier for use as a pulling strap; individually removable rollers supporting the pet carrier for rolling movement over an underlying surface; and a removable floor.

7 Claims, 8 Drawing Sheets

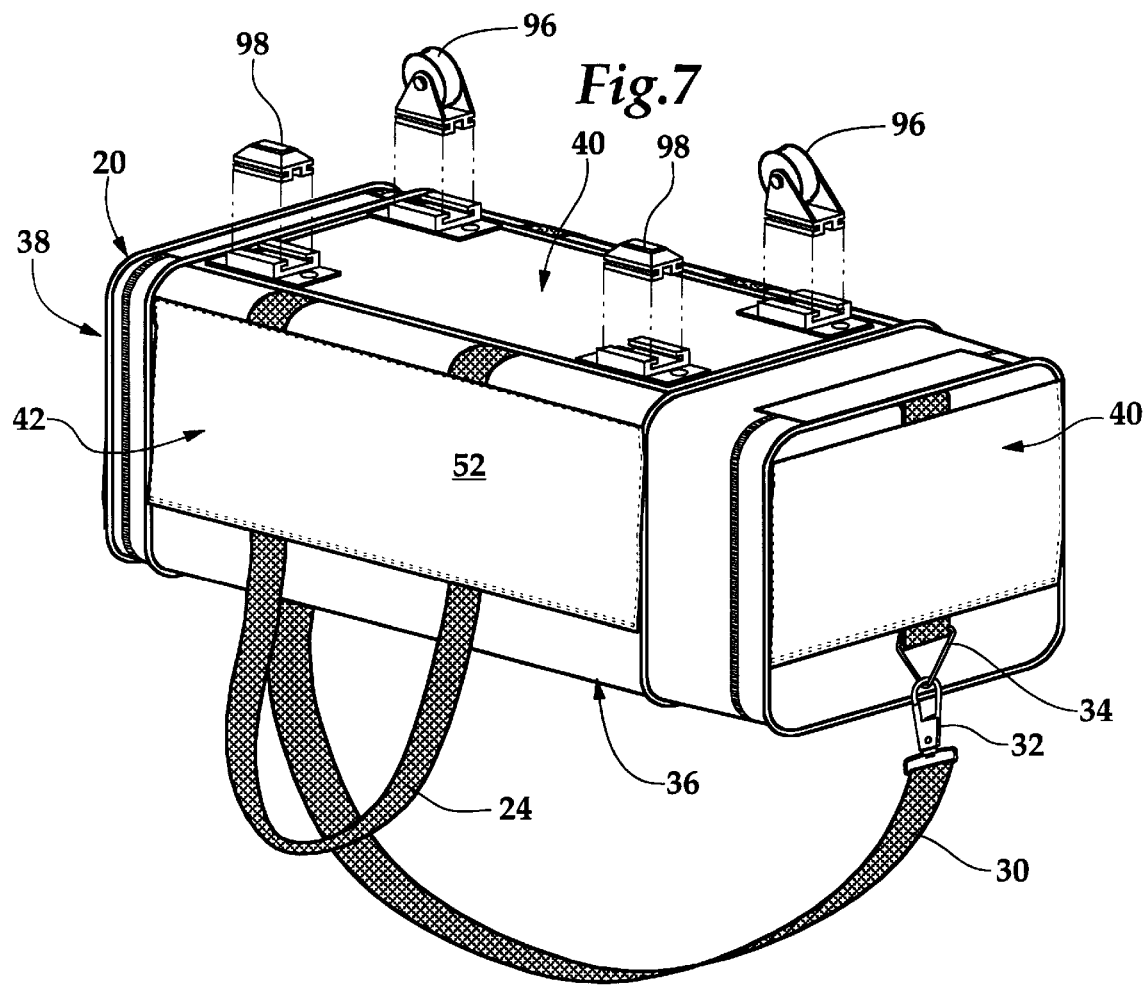
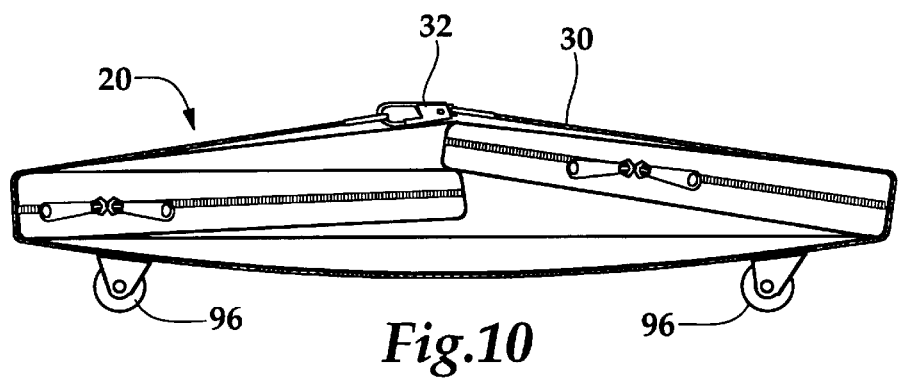

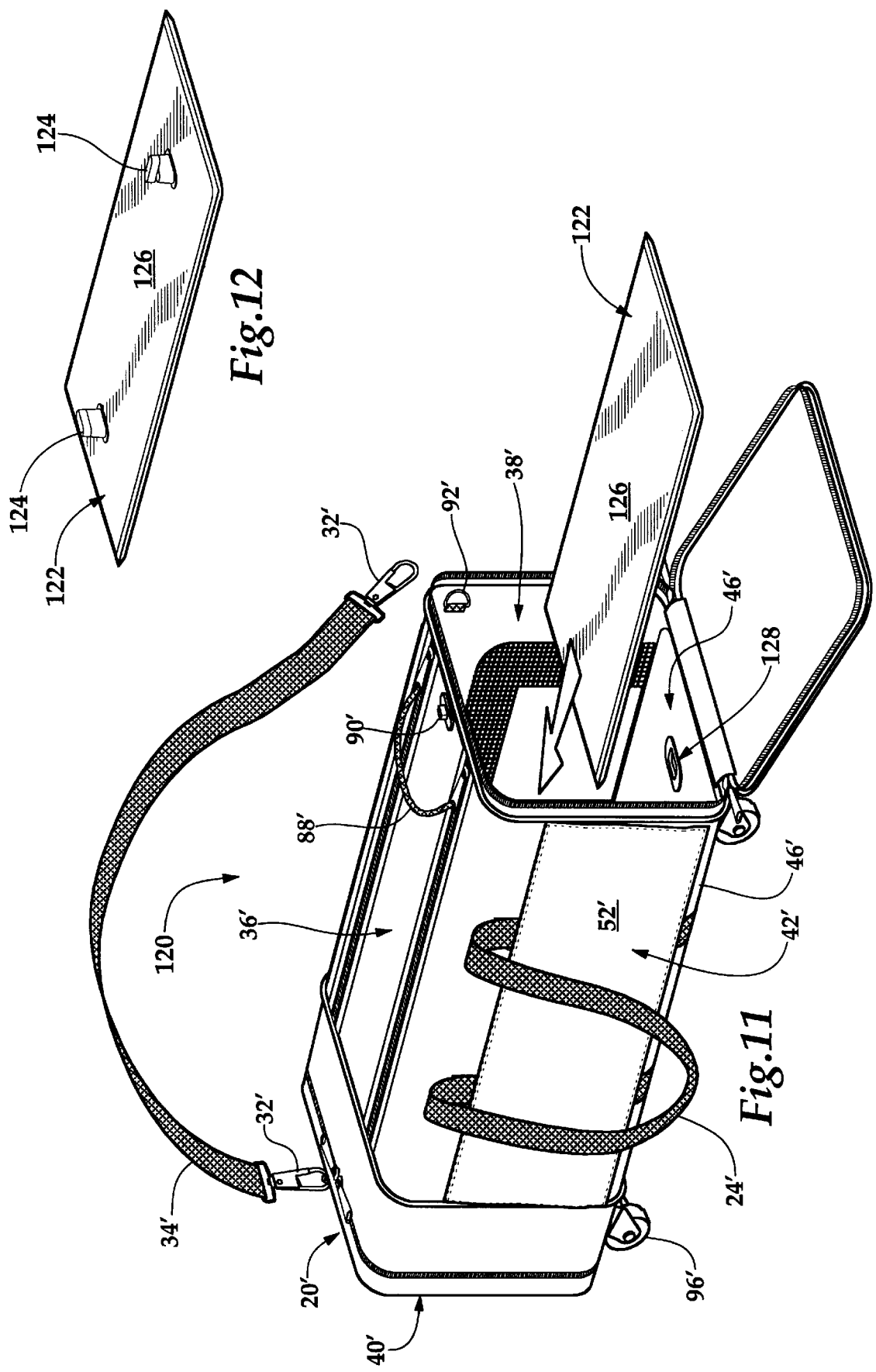

PET CARRIER FOR TRAVELERS

CROSS-REFERENCE TO RELATED APPLICATION

This application is a continuation of 09/143,825 filed Aug. 31, 1998, now pending which a continuation-in-part of application Ser. No. 08/926,525 filed Sep. 8, 1997, NOW ABANDONED.

TECHNICAL FIELD

This invention relates generally to pet carriers, and more particularly to a pet carrier for use in transporting small dogs, cats, and other small pets within the passenger compartment of an aircraft, or during automobile travel, or during visits to the veterinarian.

BACKGROUND AND SUMMARY OF THE INVENTION

As is well known, travelers wishing to take pets with them during aircraft travel have traditionally been required to house their pets in crates for transportation in the luggage compartment or hold of the aircraft. This is unsatisfactory for several reasons. First, the pets are subject to injury or death if the crates in which they are housed are dropped or overturned either during handling to and from the aircraft or during flight. Second, the luggage compartment of an aircraft is typically neither pressurized or air conditioned, which can lead to asphyxiation of pets transported in luggage compartments if sufficient oxygen is not present. Third, delays in baggage handling and unavailable delays caused by weather, mechanical problems, etc., can subject pets carried in aircraft luggage compartments to temperature extremes which can cause injury to or death of the pets.

The foregoing and other problems resulting from the transportation of pets in aircraft luggage compartments or holds has resulted in the transportation of small dogs, cats, and other similarly-sized pets within the passenger compartment of aircraft. For obvious reasons, pets presented for transportation within the passenger compartment must be constrained within pet carriers. Both hardside and softside pet carriers have been used for this purpose, with softside pet carriers being generally preferred because they are relatively light weight, adaptable to a variety of circumstances which may be encountered during a trip, and, at least in some instances, collapsible for storage when not in use.

Although generally satisfactory, the softside pet carriers intended for the transportation of pets within the passenger compartment of aircraft have exhibited numerous disadvantages. First, the design of prior art softside pet carriers has required that they be carried, either using handgrips or shoulder straps, whenever relocation is indicated. Second, the access ports of prior art softside pet carriers have not been sufficiently secure against opening by and subsequent escape of the pets intended to be restrained therein. Third, prior art softside pet carriers have not been provided with sufficient storage capacity to allow the transportation of food, water, and the necessary dishes and other accessories which must be utilized during the transportation of pets.

The present invention comprises a pet carrier for travelers which overcomes the foregoing and other difficulties long since associated with the prior art. In accordance with the broader aspects of the invention, there is provided a softside pet carrier including a bottom, two sides, two ends, and a top. The bottom is provided with wheels, rollers, or skids whereby the pet carrier and the pet contained therein can be easily pulled through airports, and in similar situations. The wheels, rollers, or skids are preferably removable to reduce the overall height of the pet carrier and to prevent unintended movement thereof.

The walls and at least one end of the pet carrier comprise windows formed from sturdy mesh panels to afford ventilation and allow the pet owner and the pet to see in and out, respectively. One or more of the windows may be coverable in instances in which privacy or confinement is preferred. One wall of the pet carrier is fully openable to allow the pet carrier to be used as a bed or crate when not in use for transportation. The openable side wall includes a pocket for use in storing veterinary documents and other small items.

One end of the pet carrier is provided with a large storage compartment adapted to receive food, water, bowls, and other accessories necessary for the proper care of a pet during transportation. The top includes an access port having a full length double zipper construction which facilitates ingress and egress of the pet. The double zipper opening can be used to allow the pet to have exposure through the centrally open top of the carrier, if desired, with the pet being secured by a leash ring. The access port is fully lockable to prevent the escape of the pet housed within the pet carrier.

In accordance with a second embodiment of the invention, a pet carrier is provided with a removable floor. In use, the removable floor is secured to the bottom of the pet carrier by rotary locks. The rotary locks of the removable floor extend through lock receiving members which are mounted in frame members comprising part of the bottom of the floor of the pet carrier. The frame members also support retainers which receive individually removable wheels and/or skids.

BRIEF DESCRIPTION OF THE DRAWINGS

A more complete understanding of the invention may be had by reference to the following detailed description when taken in conjunction with the accompanying drawings:

FIG. 7 is an illustration of the bottom of the pet carrier of FIG. 1;

FIG. 10 is an illustration of the pet carrier of the present invention fully collapsed for storage;

FIG. 11 is a perspective view illustrating a pet carrier comprising a second embodiment of the invention;

FIG. 12 is a perspective view illustrating the bottom of the removable floor of the pet carrier of FIG. 11;

DETAILED DESCRIPTION

Figure 1:
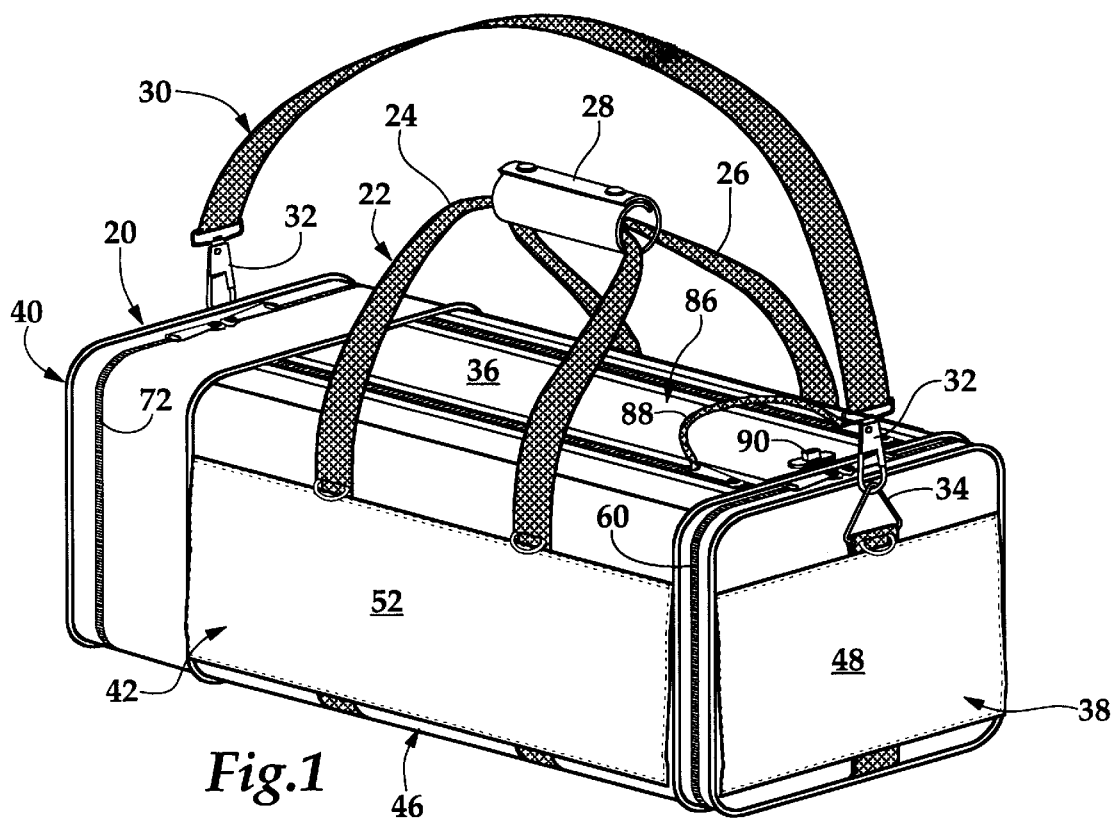
FIG. 1 is a perspective view of the pet carrier for travelers of the present invention taken from one end thereof and showing the pet carrier in its fully closed configuration.
Figure 2:
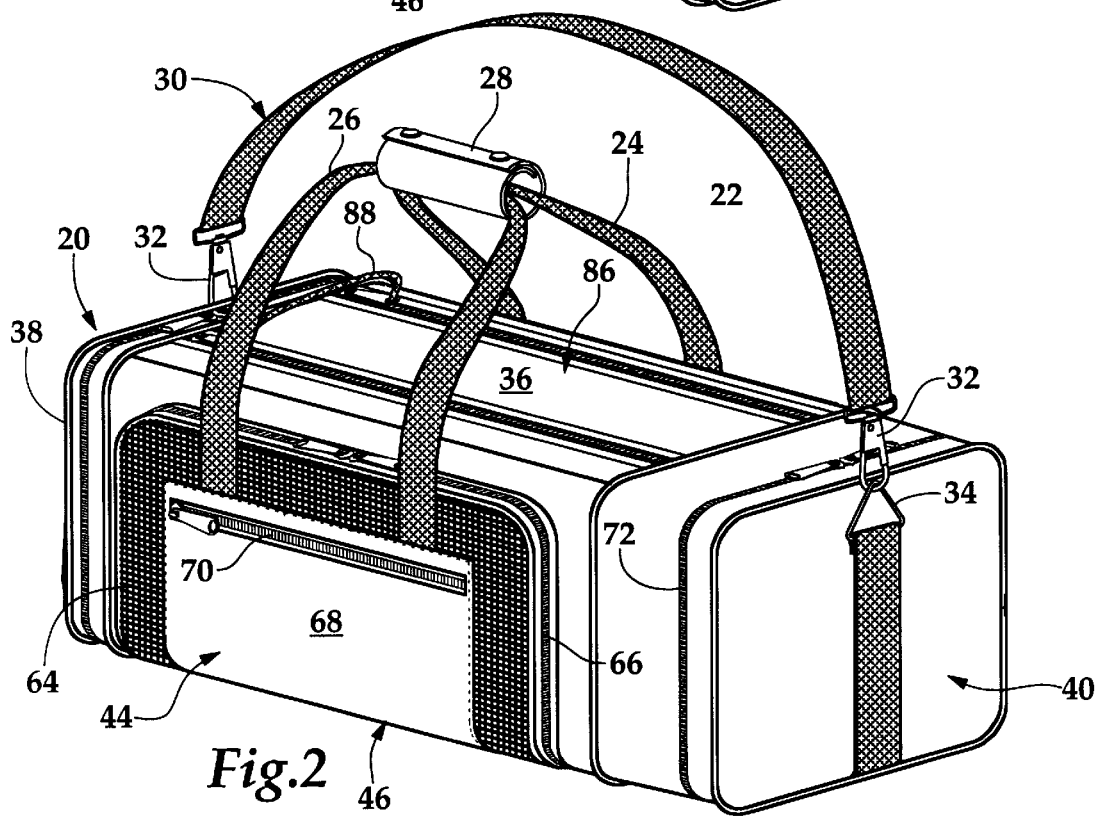
FIG. 2 is a perspective view of the pet carrier of FIG. 1 taken from the opposite end thereof.

Referring now to the Drawings, and particularly to FIGS. 1 and 2 thereof, there is shown a pet carrier 20 comprising a first embodiment of the invention. The pet carrier 20 comprises a normally closed container having a rectangular cross-section both as to its width and as to its length, it being understood that other cross-sectional configurations may be used in the practice of the invention, if desired. The pet carrier 20 may be constructed from 1200 denier polyester pvc coated waterproof fabric of the type commonly used in the construction of softside luggage, however, it will be understood that other materials may be utilized in the construction of the pet carrier 20, depending on the requirements of particular applications of the invention.

The pet carrier may be provided with a conventional handle 22 comprising opposed handle portions 24 and 26 secured to opposite sides of the pet carrier 20. The handle portions 24 and 26 may be joined together at the mid-points thereof by a gripping member 28 which snaps onto itself in the usual manner to provide a comfortable handgrip for the pet carrier 20. The pet carrier 20 is further provided with a multi-function strap 30 which is adjustable in length and which has selectively openable hooks 32 at each end thereof. In FIGS. 1 and 2 the multi-function strap 30 is shown in its shoulder strap mode with the hooks 32 being engaged with rings 34 secured at the opposite ends of the pet carrier 20. When used as a shoulder strap, the multi-function strap facilitates carrying the pet on quick in-and-out of the car trips.

Figure 3:
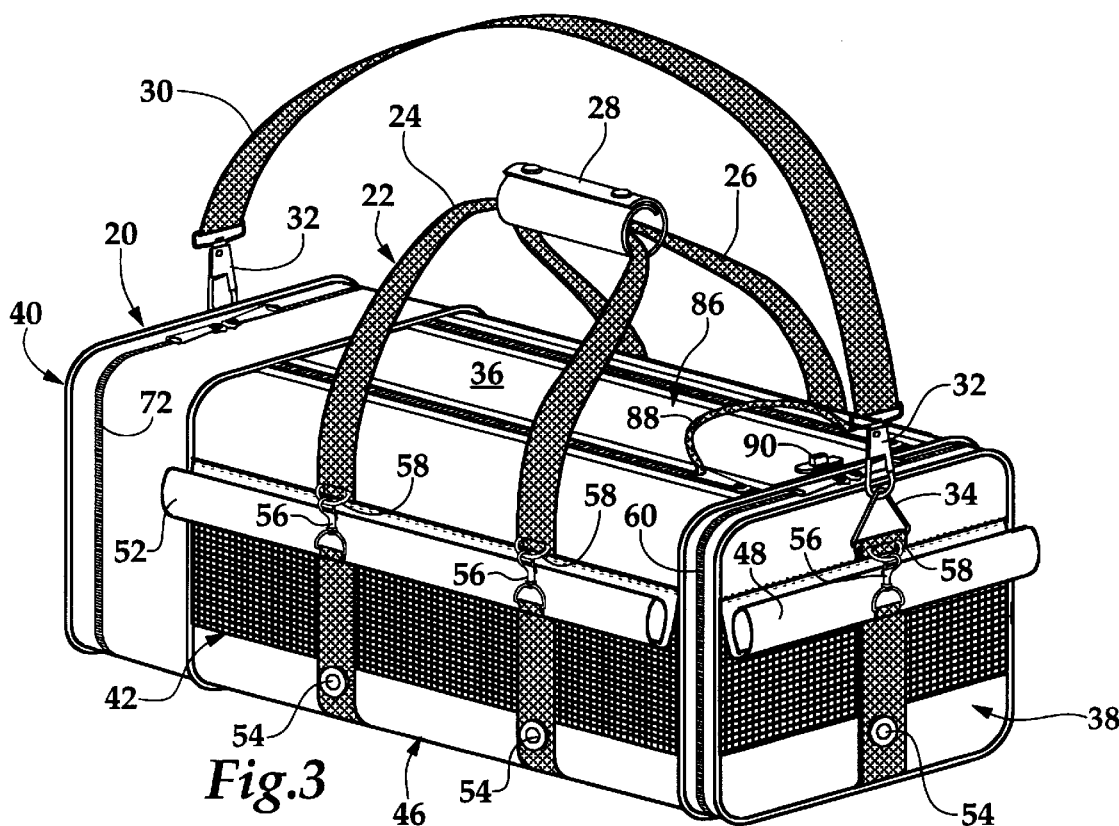
FIG. 3 is a view similar to FIG. 1 illustrating the closure flaps of the pet carrier in the open condition.
Figure 6:
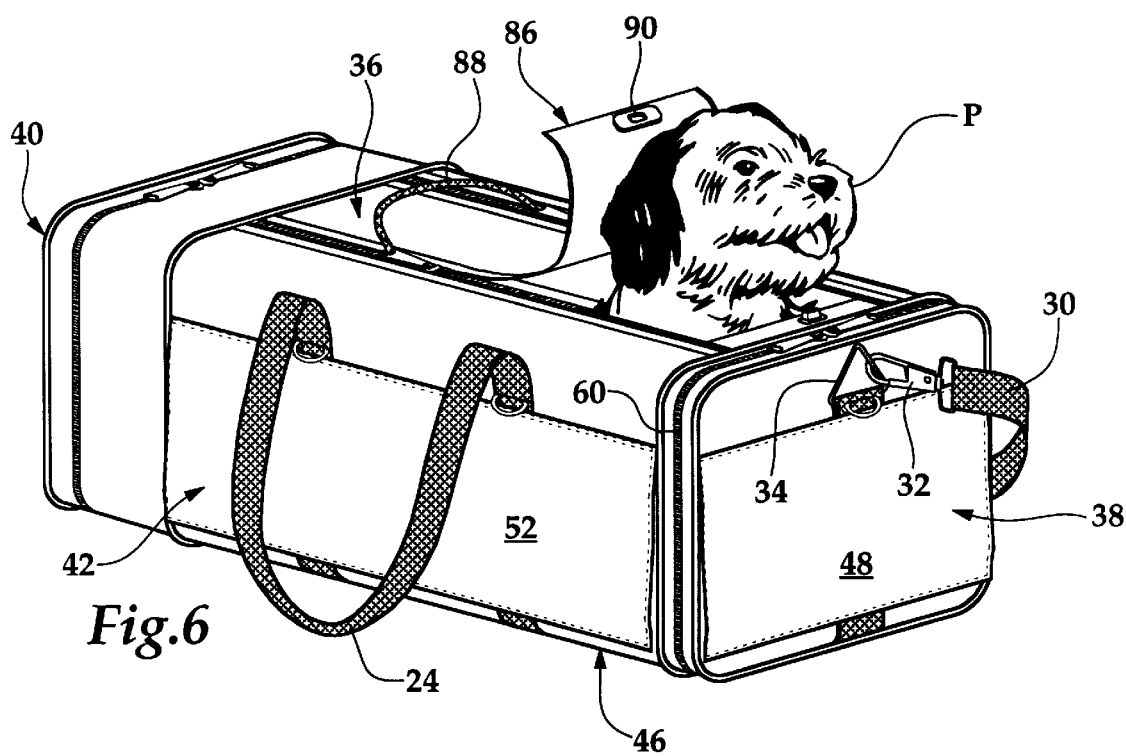
FIG. 6 is a view similar to FIG. 3 showing the top of the pet carrier in the open condition.

Pet carrier 20 includes a top 36, end walls 38 and 40, side walls 42 and 44, and a bottom 46. As is best shown in FIGS. 1 and 3, the end 38 and the side 42 are provided with closure panels 48 and 52 which may be secured in their closed positions as shown in FIG. 1 by snaps 54 (FIG. 3). Alternatively, either or both of the panels 48 and 52 may be secured in the open conditions illustrated in FIG. 3 by means of selectively openable hooks 56 which engage rings 58 secured to the end 38 and the wall 42. As is further illustrated in FIG. 3, the walls 38 and 42 comprise windows formed from a strong but flexible net material which provides the ventilation into the interior of the pet carrier 20 and which allows visual access by pet owners and pets into and out of the pet carrier 20, respectively.

Figure 5:
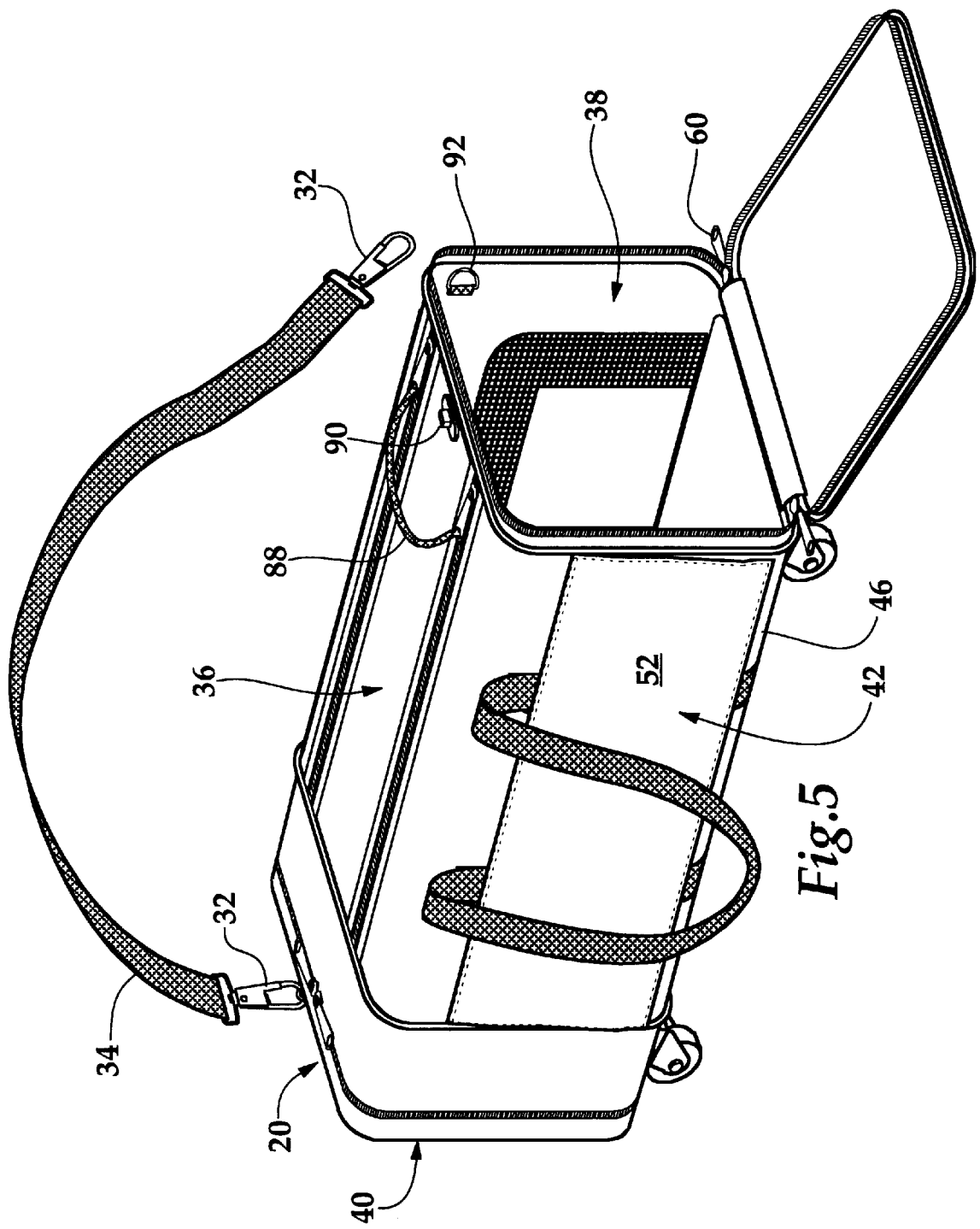
FIG. 5 is a view similar to FIG. 3 showing one end of the pet carrier in the open condition.

As is illustrated in FIG. 5, the end 38 of the pet carrier 20 is provided with a zipper 60 which is adapted for actuation to allow the end 38 to be fully opened. By means of the zipper 60, the end 38 comprises not only a window formed from the mesh material and selectively coverable by the panel 48, but also a fully openable door. The fully openable door comprising the end 38 is highly convenient in affording ingress and egress to and from the pet carrier 20 for pets, and also to facilitate cleaning of the interior of the pet carrier 20.

Figure 4:
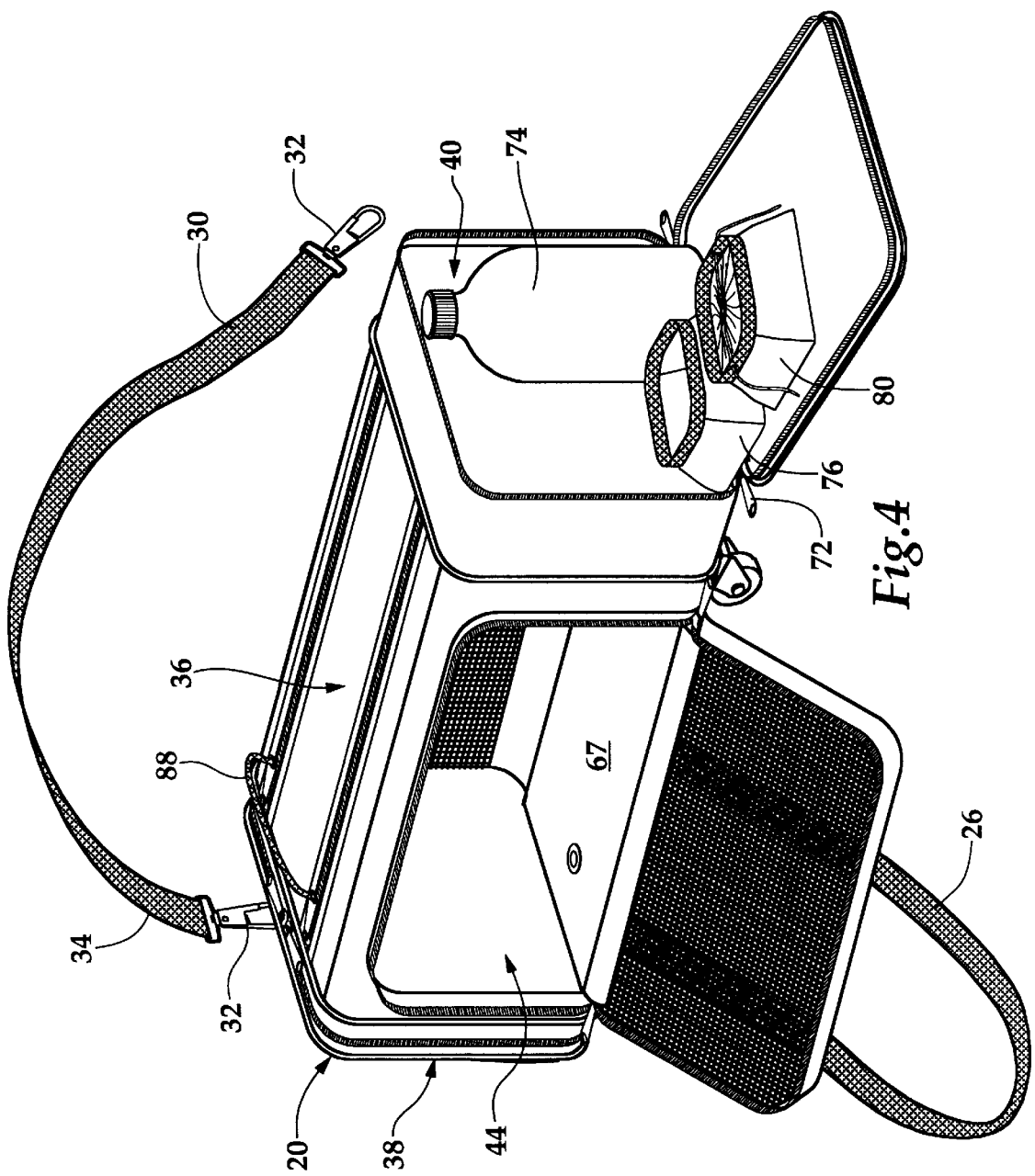
FIG. 4 is a view similar to FIG. 2 showing one of the sidewalls of the pet carrier in the fully open condition and illustrating the storage compartment of the pet carrier.

Referring now to FIGS. 2 and 4, the side 44 of the pet carrier 20 comprises a window 64 formed from mesh fabric which is both strong and flexible. The use of mesh fabric in the construction of the window 64 is highly advantageous in that it allows ventilation into and out of the interior of the pet carrier 20 and also provides visual access into and out of the interior of the pet carrier 20 for pet owners and pets, respectively. A zipper 66 extends around the periphery of the window 64 and is selectively operable to allow the window 64 to be fully opened in the manner illustrated in FIG. 4. This feature of the invention is highly advantageous in that it allows the pet carrier 20 to be used as a crate or bed when not in use as a pet carrier. FIG. 4 further illustrates a removable floor plate 67 which is preferably removable to facilitate cleaning of the pet carrier 20.

The window 64 further comprises a storage compartment 68 which is normally secured in a closed condition by a zipper 70. The storage compartment 68 provides convenient storage for veterinary records and other papers relating to the pet transported within the pet carrier 20. The storage compartment 68 may also be used to receive and store medicines and other small articles attendant to the comfort and safety of the pet.

The end 40 of the pet carrier 20 comprises a large storage compartment which is normally secured in the closed condition by a zipper 72. The storage compartment comprising the end 40 is adapted to receive a water transport container 74, a collapsible water bowl 76, and a collapsible food bowl 80 having a top that can be closed to secure pet food therein. The storage compartment can also store other accessories for the care and maintenance of the pet utilizing the pet carrier 20.

As is best shown in FIGS. 1 and 7, the top 36 of the pet carrier 20 comprises an access port 86 which is normally secured in the closed configuration by a double zipper closure 88 and a rotatable locking member 90 of the type normally used in luggage construction. When fully opened, the access port 86 provides convenient ingress and egress from the interior of the pet carrier 20 for the pet to be carried therein which is substantially wider than would be the case with a single zipper top opening. The access port 86 also provides convenient access to the interior of the pet carrier 20 for cleaning. An important feature of the present invention comprises the fact that the access port 86 may be partially opened to allow the pet contained within the pet carrier 20 to project its head out the top of the pet carrier when circumstances permit. To this end, a retaining ring 92 is provided within the interior of the pet carrier 20 to secure the pet against jumping out through the access port 86 when it is partially opened.

Referring now to FIG. 7, the bottom 46 of the pet carrier 20 is shown. The bottom 46 is provided with a plurality of wheels or rollers 96 or skids 98 which facilitate the transportation of the pet carrier 20 and the pet contained therein through airports, and in similar situations. The wheels or rollers 96 or skids 98 are preferably removable from the bottom 46 in order to reduce the overall height of the pet carrier 20, and also to secure the pet carrier 20 against inadvertent movement at all times except during the actual transportation of a pet within the pet carrier 20.

Figure 8:
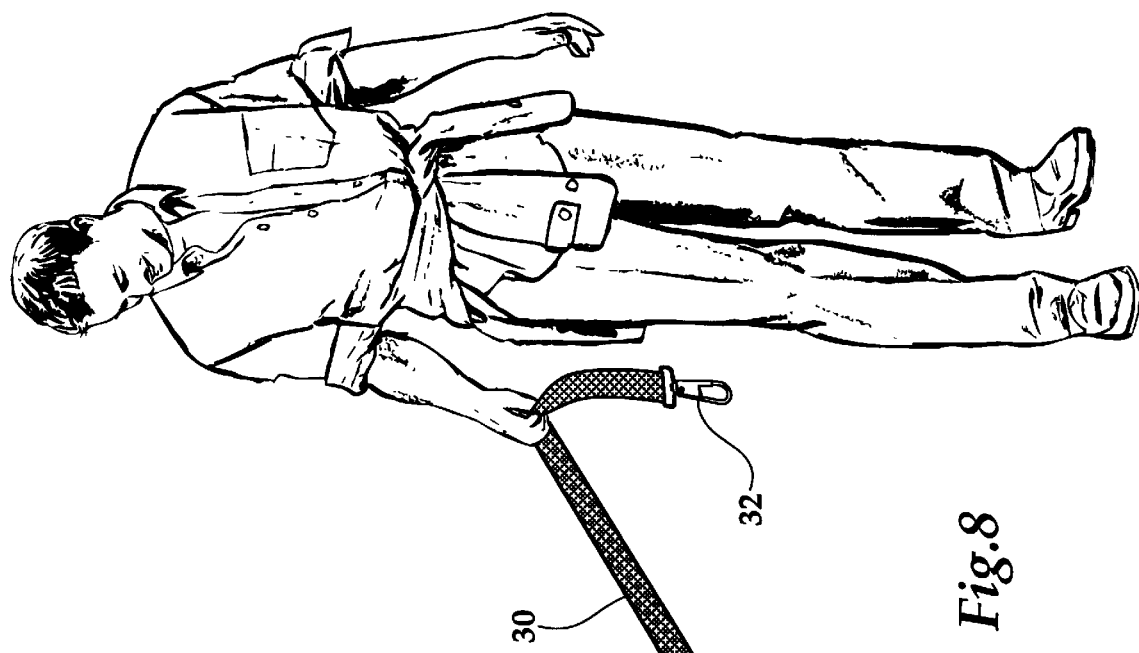
FIG. 8 is an illustration of the use of the pet carrier of the present invention showing the shoulder strap of the pet carrier in its pulling configuration and illustrating the head of a pet extending through the partially open top of the pet carrier.

The use of the pet carrier 20 is illustrated in FIG. 8. The multi-function strap 30 is disengaged from the ring 34 at one end of the pet carrier 20 and is used in its pulling mode to roll or slide the pet carrier 20 through an airport or other similar circumstance by means of the wheels or rollers 96 or skids 98 secured to the bottom 46 thereof. If circumstances permit, the access port 86 comprising the top 36 of the pet carrier 20 may be partially opened to allow the pet to project its head therethrough. In such circumstances, the pet carrier is preferably secured within the interior of the pet carrier 20 by connecting its collar to the retaining ring 92.

Figure 9:
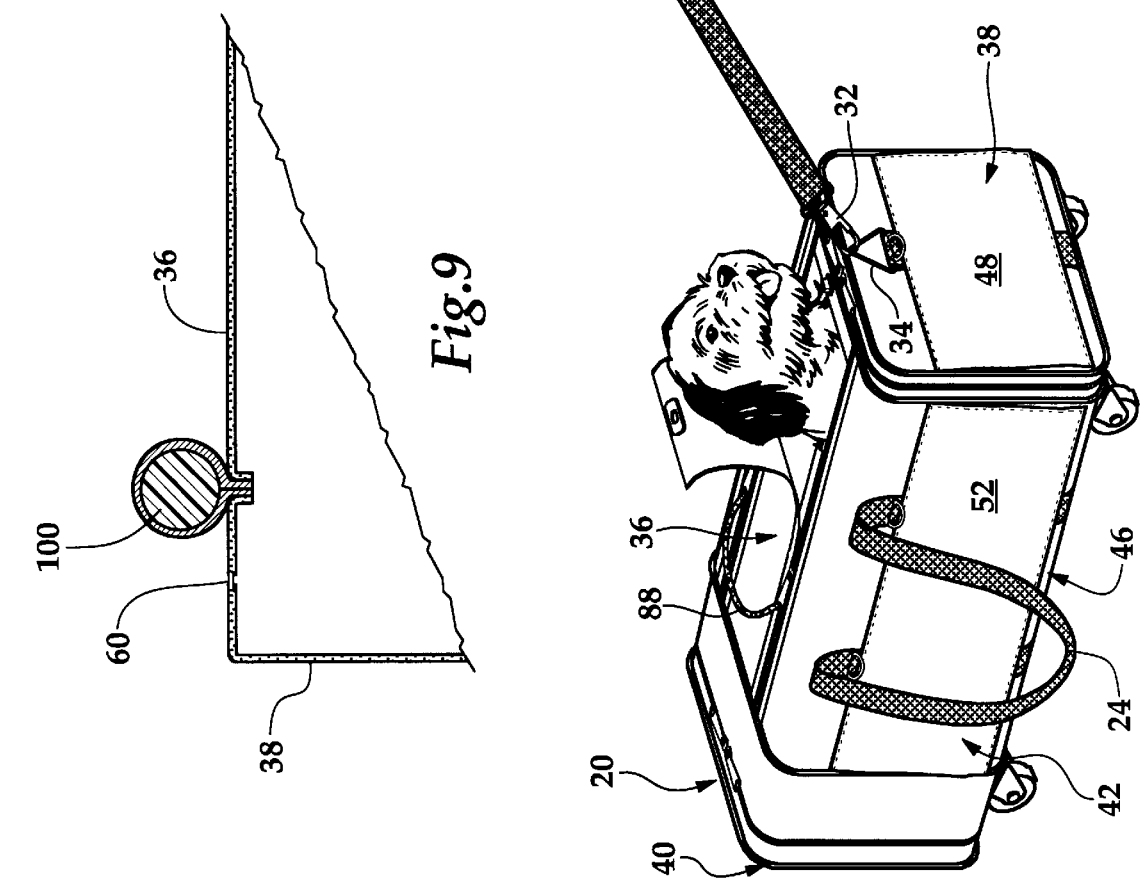
FIG. 9 is a greatly enlarged partial sectional view showing suspension structure of the pet carrier of the present invention.
Figure 13:
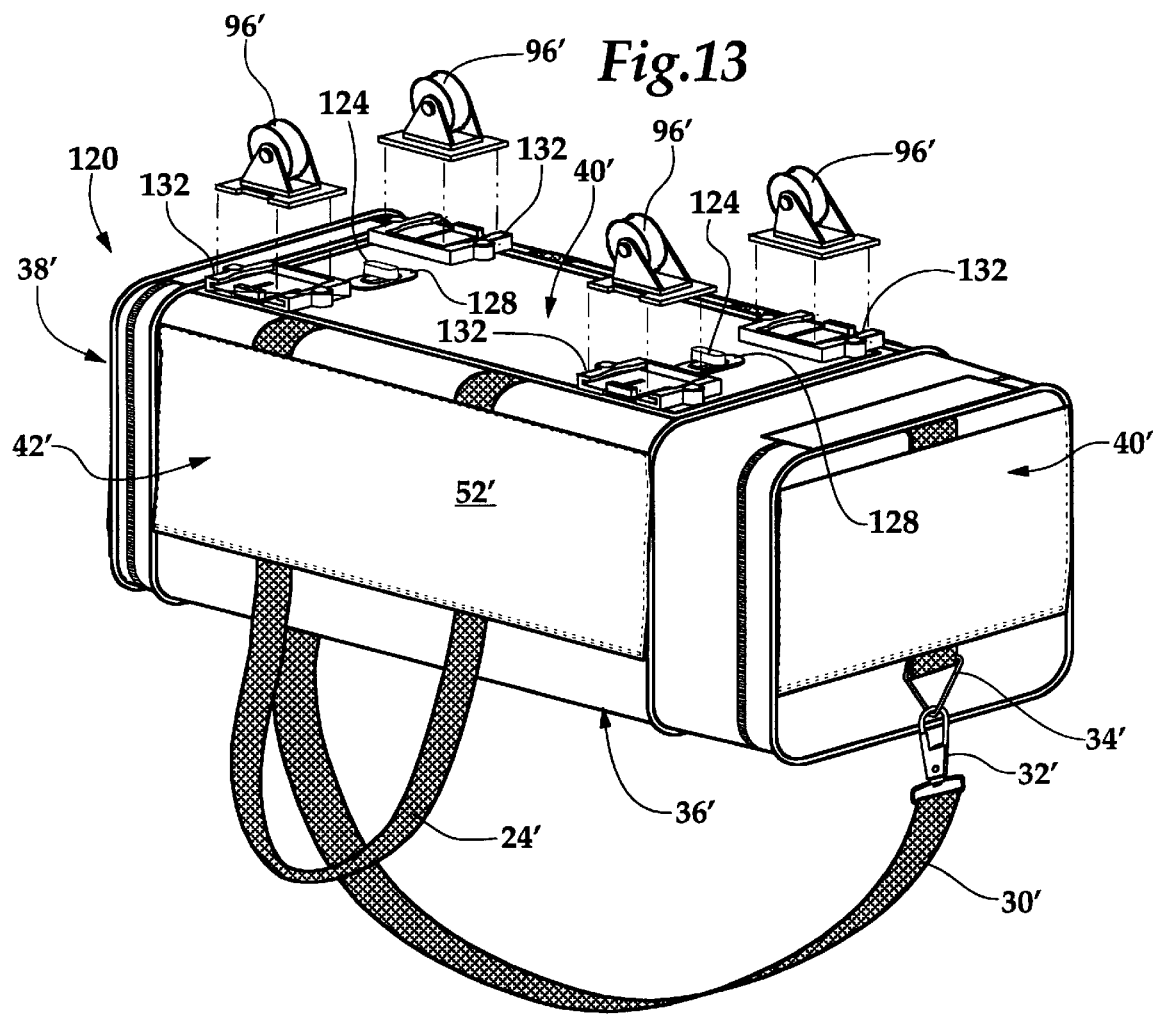
FIG. 13 is a bottom perspective view of the pet carrier of FIG. 11.

FIG. 9 illustrates an important feature of the invention. The pet carrier 20 is provided with supporting members 100 which are secured along the walls 42 and 44 and the top 36 of the pet carrier 20 adjacent to the ends 38 and 40 thereof. The supporting members 100 are preferably formed from fiberglass which allows the pet carrier to be collapsed when located under the seat of an aircraft. The supporting members 100 may also be formed from suitably flexible wire or other materials. The use of the supporting members 100 is important in that it prevents the top 36 of the pet carrier from collapsing down onto the pet and maintains the interior of the pet carrier 20 in its fully open and upright condition to provide maximum freedom of movement and maximum interior space for the enjoyment of the pet contained therein. As is shown in FIG. 10, the supporting members 100 allow the pet carrier 20 to be folded for storage.

Referring now to FIGS. 11, 12, 13, and 14, there is shown a pet carrier 120 comprising a second embodiment of the invention. The pet carrier 120 comprises numerous component parts which are substantially identical in construction and function to the component parts of the pet carrier 20 illustrated in FIGS. 1 through 10 inclusive, and described hereinabove in connection therewith. Such identical component parts are designated in FIGS. 11 through 14 inclusive, with the same reference numerals utilized in the foregoing description of the pet carrier 20, but are differentiated therefrom by means of a prime (') designation.

The pet carrier 120 includes a removable floor 122. As is best shown in FIG. 12, the bottom of the removable floor 122 is provided with a pair of rotatable locks 124. The removable floor 122 is preferably relatively rigid in construction, and has an exterior surface 126 which is impervious to moisture and readily adapted to cleaning.

Figure 14:
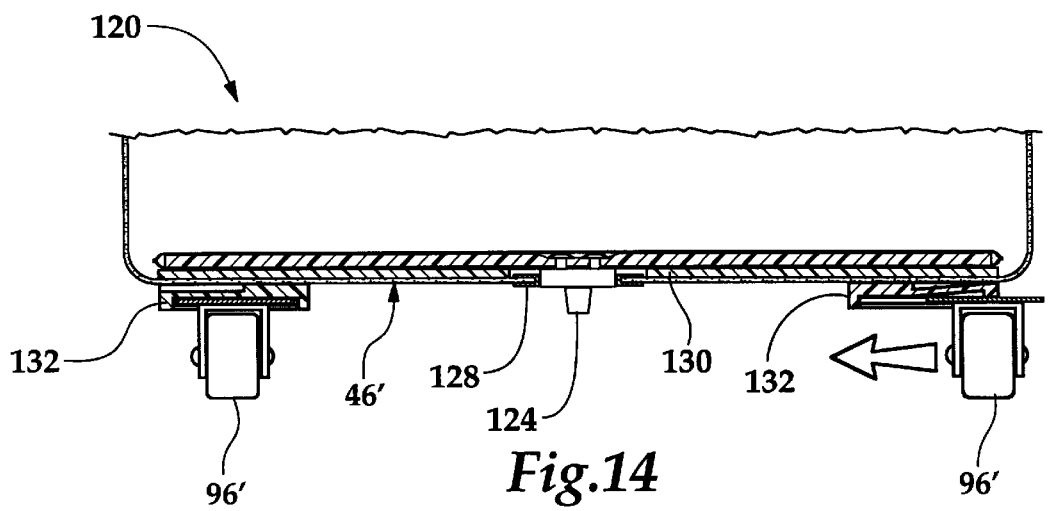
FIG. 14 is a transverse sectional view taken through the bottom of the pet carrier of FIG. 11.

The bottom 46' of the pet carrier 120 is provided with lock receiving members 128. As is best shown in FIG. 14, the lock receiving members 128 of the pet carrier 120 are secured in a frame member 130 which is in turn secured to the bottom 46' of the pet carrier 120. The frame member 130 also supports retainers 132 which selectively receive and retain either individually removable wheels 96' or individually removable skids (as shown in FIG. 7). The use of the frame members 130 to secure the lock receiving members 128 and the retainers 132 comprises an important feature of the invention in that the frame members 130 lend stability to the bottom of the pet carrier 120 and assure that the lock receiving members 128 and the retainers 132 are secured in place.

The use of individually removable wheels and/or skids also comprises an important feature of the invention. Individual wheels and/or skids are much easier to store than would be the case if the wheels and/or skids were mounted on a subframe which was in turn securable to the bottom of the pet carrier. Also, individually removable wheels and/or skids allow selected wheels to be replaced with skids in the event it is desired to facilitate both rolling transport of the pet carrier across an underlying surface and stability of the pet carrier when it is not in motion.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

What is claimed is:

1. A pet carrier comprising:
    a first wall including a window providing ventilation and visual access and a window closure for selectively closing the window;
    a second wall including a window providing ventilation and visual access, closure apparatus extending around the periphery of the window for providing access to the interior of the pet carrier, a storage compartment comprising part of the window, and closure apparatus for normally securing the storage compartment in a closed condition;
    a first end comprising a storage compartment and closure apparatus for normally securing the storage compartment in the closed condition;
    a second end comprising a window, a window closure member, apparatus for selectively securing the window closure member either in an open condition to provide ventilation and visual access to the interior of the pet carrier through the window or in a closed condition, closure apparatus extending around the periphery of the window for selectively opening the second end to provide access to the interior of the pet carrier;
    a top including an access port, apparatus for normally securing the access port in a closed condition, the access port securing apparatus being operable to permit partial or full opening of the access port to provide partial or full access to the interior of the pet carrier;
    a bottom including a plurality of individually removable support members permitting movement of the pet carrier through airports and in similar circumstances, the support members being removable to lower the overall height of the pet carrier and to prevent inadvertent movement of the pet carrier when not used for the actual transportation of a pet;
    a removable floor having a pair of rotatable locks mounted thereon;
    frame members secured to the bottom and including lock receiving members for receiving the rotatable locks of the removable floor to secure the floor in place and retainers for securing the individually removable support members to the bottom;
    at least one strap engageable with both ends of the pet carrier for use as a shoulder strap and selectively engageable with one end of the pet carrier for use as a pulling strap for moving the pet carrier and a pet contained therein through airports and the like; and
    two support members one extending around the periphery of said first end and the other extending around the periphery of said second end for normally maintaining the first and second walls and the first and second ends upright to afford maximum space within the pet carrier and each collapsible to facilitate use of the pet carrier in cramped quarters and for storage.

2. The pet carrier according to claim 1 wherein the windows of the first wall the second wall, and the second end comprise mesh fabric.

3. The pet carrier according to claim 1 wherein the window closure of the first wall comprises an opaque fabric layer securable over the window.

4. The pet carrier according to claim 1 wherein the apparatus for normally securing the access port of the top includes spaced, parallel zippers extending along opposite sides of the access port, an aperture formed in the access port, and a rotatable lock receivable in the aperture.

5. The pet carrier according to claim 1 wherein the removable support members comprises a plurality of wheels.

6. The pet carrier according to claim 1 wherein the removable support members comprises a plurality of skids.

7. The pet carrier according to claim 1 wherein the support members are formed from fiberglass.

* * * * *